United States Patent
Walton et al.

(10) Patent No.: US 12,498,282 B2
(45) Date of Patent: Dec. 16, 2025

(54) VIBRATION ANALYSIS USING MACHINE STATE

(71) Applicant: SOFTING, INC., Knoxville, TN (US)

(72) Inventors: Keith A. Walton, Jonesborough, TN (US); Nathan Miserocchi, Knoxville, TN (US); Timothy E. Wallaert, Wylie, TX (US)

(73) Assignee: SOFTING, INC., Knoxville, TN (US)

( * ) Notice: Subject to any disclaimer, the term of this patent is extended or adjusted under 35 U.S.C. 154(b) by 183 days.

(21) Appl. No.: 18/510,190

(22) Filed: Nov. 15, 2023

(65) Prior Publication Data

US 2024/0085260 A1 Mar. 14, 2024

Related U.S. Application Data

(63) Continuation-in-part of application No. 17/979,521, filed on Nov. 2, 2022, now Pat. No. 11,881,059.

(60) Provisional application No. 63/275,043, filed on Nov. 3, 2021.

(51) Int. Cl.
*G01M 1/22* (2006.01)

(52) U.S. Cl.
CPC .................................. *G01M 1/22* (2013.01)

(58) Field of Classification Search
CPC ...... G06F 2207/00; G06F 11/00; G06F 11/30; G06F 11/34; G06F 11/3438; G06F 11/348; G06F 11/3466; G06F 11/3495; G06F 11/88; G06F 11/885
USPC .......................................................... 377/16
See application file for complete search history.

(56) References Cited

U.S. PATENT DOCUMENTS

| | | | |
|---|---|---|---|
| 10,921,777 B2 | 2/2021 | Rich et al. | |
| 11,881,059 B2 * | 1/2024 | Walton | G06F 17/142 |
| 12,228,477 B1 * | 2/2025 | Wu | G01M 99/005 |

* cited by examiner

*Primary Examiner* — Hai L Nguyen
(74) *Attorney, Agent, or Firm* — Frederick L. Tolhurst; Dentons Cohen & Grigsby, P.C.

(57) ABSTRACT

A system and method for detecting abnormal operating conditions in a machine using vibration data. An example aspect is configured to: identify at least one operating state of the machine; collect baseline vibration data to determine a baseline vibrational condition of each operating state; collect vibration data of the machine; segregate the vibration data according to each operating state of the machine; analyze the segregated vibration data; and determine when the segregated vibration data has changed from the baseline vibration data by a threshold amount for each operating state.

40 Claims, 6 Drawing Sheets

Alarms

☰ Enable Blinking ☐

| Group | Machine | Level | Date/Time | Issue | Recommended Action | Ack/Ign |
|---|---|---|---|---|---|---|
| Group1 | Machine1 | Critical. 5 | MM/DD/YYYY XX:XX AM/PM | Fan Issue | Examine the fan and address the Issue | |

Show Cleared Alarms ☑ Show Unspecified Alarms ☑

| Group | Machine | Level | Date/Time | Issue | State | Speed |
|---|---|---|---|---|---|---|
| Group 1 | Machine 1 | Critical. 5 | MM/DD/YYYY XX:XX AM/PM | Fan Issue | 3 - High Speed | 1000-1200 |
| Group 1 | Machine 1 | Urgent. 4 | MM/DD/YYYY XX:XX AM/PM | Fan Issue | 3 - High Speed | 1000-1200 |
| Group 1 | Machine 1 | Alarm- 3 | MM/DD/YYYY XX:XX AM/PM | Fan Issue | 3 - High Speed | 1000-1200 |
| Group 1 | Machine 1 | Alert- 2 | MM/DD/YYYY XX:XX AM/PM | Fan Issue | 3 - High Speed | 1000-1200 |
| Group 1 | Machine 1 | Pre-Alert- 1 | MM/DD/YYYY XX:XX AM/PM | Fan Issue | 3 - High Speed | 1000-1200 |

FIG. 3

VIBRATION ANALYSIS USING MACHINE STATE

CROSS-REFERENCE TO RELATED APPLICATIONS

The present application is a continuation-in-part of U.S. patent application Ser. No. 17/979,521 filed on Nov. 2, 2022, which claims priority to U.S. Provisional Application No. 63/275,043, filed on Nov. 3, 2021.

FIELD OF THE INVENTION

This disclosure generally relates to the field of machine function analysis, and more particularly, identifying and diagnosing abnormal operating conditions in machines.

BACKGROUND

Various methods and devices have been developed for the purpose of identifying functional abnormalities in various types of mechanical devices. In some cases, hand-held devices or permanently mounted sensors have been used to detect and record vibrations in machines. The vibrational data is then analyzed according to established techniques. Often, such methods and devices require the expertise of specially trained technicians that have the experience and training to enable them to understand and use the same. In some cases, the prior art devices collect and record data that is then analyzed by a trained technician.

Such prior systems and methods are subject to misinterpretation, computational errors, and other mistakes and misjudgments of technicians. Also, such prior systems and methods may not achieve an accurate result because the timing of monitoring devices does not accommodate the inspection schedules of inspectors or the sampling schedules of mechanical surveillance mechanisms.

The prior art includes devices and procedures wherein machines may be inspected through regimens of regular inspection and maintenance, but only at times when the machine is not in service. Such devices and procedures include disassembly and inspection of the machine components. However, such devices and procedures generally have not enabled the identification of abnormal machine function at its incipient stages, particularly at times when the machine is operating in its normal working capacity and environment. Such prior devices and methods often require taking the machine out of service either according to a schedule for inspection or maintenance or after the machine defect has become apparent due to the obvious loss of function or the compromise of machine performance.

In many cases, machines develop minor defects that are not immediately apparent to observers or established monitoring devices or procedures. However, continued operation of the machine under such conditions results in material wear or damage to the machine that could be avoided if the defect, wear, or minor damage causing the abnormal behavior could be identified and remedied at an early stage in the wear process.

BRIEF SUMMARY

The present disclosure enables the identification of abnormal machine operation at an incipient stage. In this way, the presently disclosed methods and systems provide a basis for avoiding the aforementioned difficulties through the early identification of abnormalities and malfunctions resulting from undiagnosed and unremedied machine wear, defect, or damage.

The presently disclosed methods and systems may make such identifications and diagnoses at times when the machine under evaluation remains fully operational in its intended working environment. The present disclosure enables normally skilled machine operators to recognize the early identification and diagnosis of compromised machine operations or functions without the need for the special knowledge, training, or experience of the operator and without the intervention of specially trained technicians.

The presently disclosed methods and systems also may identify abnormal machine function at a point in the machine wear cycle when an abnormal function is not apparent to a human observer or even to conventional machine monitoring devices that are intended to identify abnormal machine functions and behaviors.

The present disclosure provides methods and systems for identifying abnormal behavior of a machine using vibrational data, including identifying at least one operating state of the machine; collecting baseline vibration data to determine a baseline vibrational condition of each operating state; collecting vibration data of the machine; segregating the vibration data according to each operating state of the machine; analyzing the segregated vibration data; and determining when the segregated vibration data has changed from the baseline vibration data by a threshold amount for each operating state.

The presently disclosed invention may be embodied as a system, method, or computer program product embodied in any tangible medium of expression having computer useable program code embodied in the medium.

DESCRIPTION OF THE DRAWINGS

It is to be understood that both the foregoing summary and the following drawings and detailed description may be exemplary and may not be restrictive of the aspects of the invention as claimed. Certain details may be set forth in order to provide a better understanding of various features, aspects, and advantages of the invention. However, one skilled in the art will understand that these features, aspects, and advantages may be practiced without these details. In other instances, well-known structures, methods, and/or processes associated with methods of practicing the various features, aspects, and advantages may not be shown or described in detail to avoid unnecessarily obscuring descriptions of other details of the invention.

The presently disclosed invention may be better understood by reference to the accompanying drawing sheets, in which:

FIG. 3 is a representation of multiple alarms and alarm thresholds for a machine having an abnormal condition and a recommended action for the abnormal condition in accordance with aspects of the present disclosure.

DETAILED DESCRIPTION

The presently disclosed invention provides improved analysis and identification of operating abnormalities of machines by detecting and analyzing vibrational data of at least one operating state of a machine.

Figure 1:
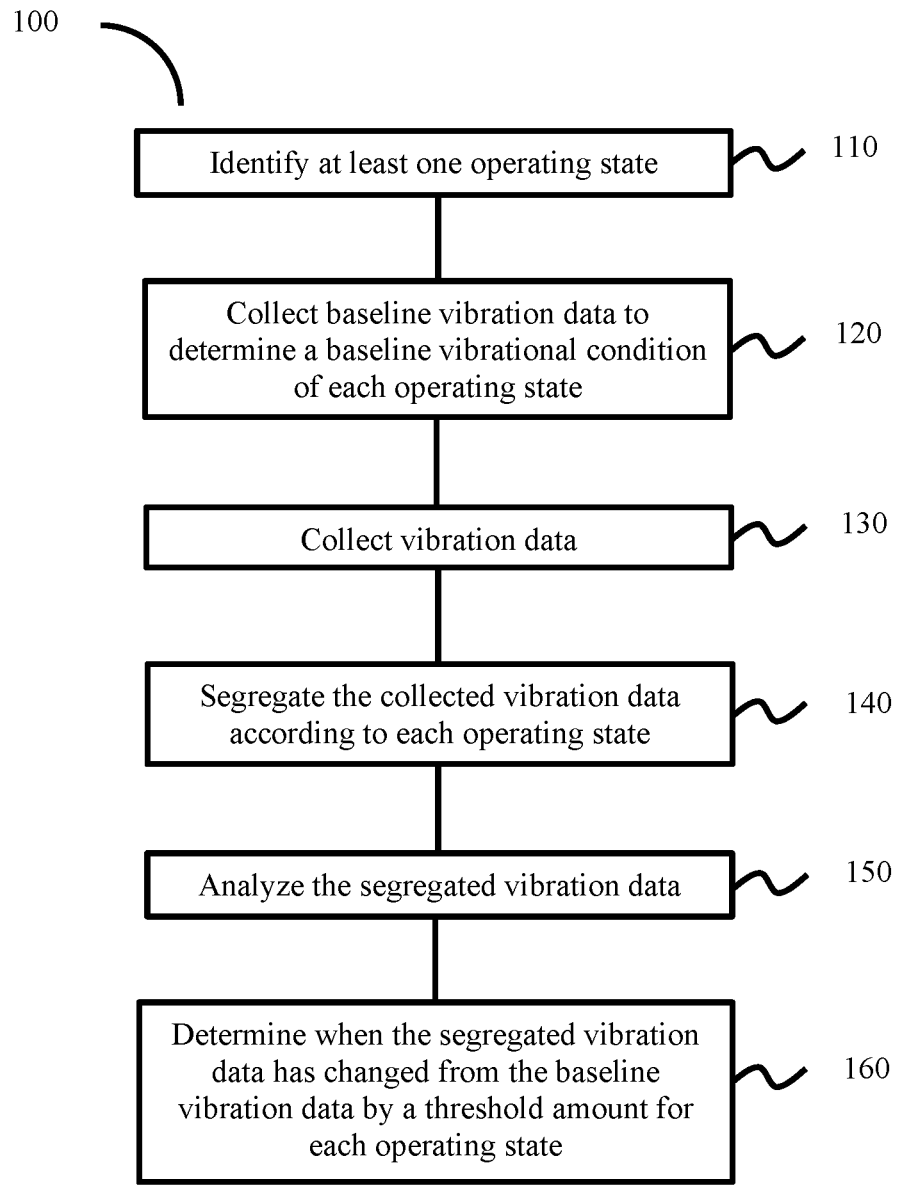
FIG. 1 is a flow chart of a method for detecting abnormal operation of a machine, in accordance with aspects of the present disclosure.

The presently disclosed invention provides a method 100 (FIG. 1) for identifying abnormal behavior of a machine while the machine is in operation using vibrational data. The method 100 may identify at least one operating state of a machine 110. As used herein, an "operating state" refers to any characteristic or property that describes a condition under which a machine is operating. An operating state may transition from one operating state to another. An operating state may include, but is not limited to, speed, load, internal machine temperature, acceleration, pressure, degree of rotation, direction of rotation, position change, and the like. An operating state may also include at least one environmental factor, including but not limited to, wind speed, wind direction, wave current, ambient temperature, ambient air pressure, ambient humidity, pH, hydrostatic pressure, and the like.

The methods and systems of the present disclosure may determine at least one operating state according to user input, wherein a user may be prompted to input at least one operating state of the machine. The methods and systems of the present disclosure may automatically determine at least one operating state according to any method, device, and/or system known in the art capable of determining an operating state of a machine.

The method 100 may determine at least one operating state to monitor, wherein a user may be prompted to input at least one operating state to monitor. The method 100 may determine at least one operating state to ignore, wherein a user may be prompted to input at least one operating state to ignore. The method 100 may automatically determine at least one operating state to monitor and/or at least one operating state to ignore. As a non-limiting example, a user may input to monitor an operating state including speed and also input to ignore an idling operating state.

The method 100 may collect baseline vibration data to determine a baseline vibrational condition of each operating state 120. The method may collect baseline vibration data using any sensing device known in the art that is capable of generating vibration data in response to at least one monitored machine behavior. The baseline vibrational condition of each operating state may be used to determine a change in machine behavior from baseline conditions.

A machine need not be operating in a normal operating condition for the methods and systems of the present disclosure to effectively detect abnormal machine behavior. As a non-limiting example, a baseline vibrational condition of each operating state may be determined from a machine that is operating abnormally. The methods and systems of the present disclosure may detect further changes in machine operation, including but not limited to, machine degradation, machine wear, and the like. Thus, the method may collect baseline vibration data during times of normal machine operation and/or during times of abnormal machine operation. As used herein, the term "normal" refers to standard, typical, and expected machine operation, wherein "abnormal" refers to any machine operation that deviates from normal machine operation.

After collecting baseline data, the method 100 may determine at least one alarm threshold that is specific to the machine, machine part, system, or structure being monitored. The methods and systems of the present disclosure may automatically determine at least one alarm threshold and/or may prompt a user to determine at least one alarm threshold. The method may determine at least one alarm threshold, including but not limited to, at least 1, 2, 5, 10, 15, 20, 25, 50, 100, 200, 300, 500, and at least 1000 alarm thresholds. The at least one alarm threshold may be specific to each operating state.

The method 100 may monitor the machine by collecting vibration data of the machine 130. Collecting vibration data may include using at least one sensing device known in the art that is capable of generating vibration data in response to at least one monitored machine behavior. The methods and systems of the present disclosure may collect vibration data from the entire machine, a part of a machine, a system including a machine, a system having at least two machines, and/or at least two or more parts of a machine. When vibration data is collected, the methods and systems of the present disclosure may continue to monitor each operating state and/or changes in operating state simultaneously as vibration data is collected. The methods and systems of the present disclosure may utilize at least one sensor, including, but not limited to at least 1, 2, 3, 4, 5, 10, 15, and at least 20 sensors. As a non-limiting example, a sensor may be placed on each bearing and/or in each of the machine's primary directions, including but not limited to, horizontally, vertically, and axially. Increasing the number of sensors may provide earlier identification of an abnormal operating condition and may provide more specific isolation of the abnormal operating condition. The type of sensor may depend on the type of machine or machine part to be monitored. Sensors may be attached to a machine or machine part according to conventional methods known in the art.

The method 100 may collect vibration data according to at least one sampling interval. A sampling interval may include at least one second or within a timeframe reasonably expected to reliably monitor machine function. The minimum sampling rate within a sampling interval and the minimum length of time for a sampling interval may depend on how quickly the monitoring equipment is capable of acquiring data and the number of sensors. Thus, the methods and systems may collect vibration data as fast as the monitoring equipment and sensors may acquire the data. The method may collect vibration data at least every second. A sampling interval may include but is not limited to, at least one millisecond, one second, one minute, 5 minutes, 10 minutes, 15 minutes, 20 minutes, 30 minutes, 45 minutes, 1 hour, 3 hours, 12 hours, 24 hours, 3 days, one week, two weeks, one month, three months, six months, one year, and the like. The methods and systems of the present disclosure may collect at least one sample of vibration data within the same sampling interval, including but not limited to, at least 1, 2, 3, 4, 5, 10, 15, 20, 25, 30, 35, 40, 45, and at least 50 samples within a sampling interval. As a non-limiting example, the methods and systems of the present disclosure may collect ten samples of vibration data per second.

The methods and systems of the present disclosure are not dependent upon the frequency of samples and may effectively detect abnormal machine behavior regardless of the frequency of samples within a sampling interval, the length of time per sampling interval, or the number of samples within a sampling interval.

The method 100 may segregate the collected vibration data according to each operating state of the machine 140.

Segregating the collected vibration data may include grouping the vibration data in a data bin corresponding to each operating state. The vibration data may be discriminated according to at least one sampling interval, wherein each sampling interval may be segregated into at least two data bins to effectively monitor vibration data across multiple sampling intervals.

The method 100 may analyze the segregated vibration data 150. Analyzing the segregated vibration data may include processing the segregated vibration data using at least one vibration analysis method, wherein a vibration analysis method may include, but is not limited to, trend analysis, multiple trend comparisons, pattern recognition, signature change recognition, determining harmonics of frequencies, analyzing sidebands about frequencies, enveloping, spectral banding, autocorrelation, low frequency analysis, high frequency analysis, frequency filtering, synchronous energy analysis, nonsynchronous energy analysis, multiple point correlation, and any other vibration analysis method known in the art.

Vibration data may be monitored according to a suitable electronic interface. Processing vibration data may be executed on any commercially available computer, including but not limited to, Linux OS module on a Rockwell Automation 1756 Compute module, a Linux OS virtual machine running in the cloud, any networked Linux OS machine, a Linux OS industrial computer, or any commercially available computer having an operating system including, but not limited to, Linux, Windows, UNIX, or MAC OS. In an aspect of the presently disclosed invention, the forgoing processing devices or any other electronic, computation platform of a type designed for electronic processing of digital data as herein disclosed may be used.

Analyzing the segregated vibration data 150 may include comparing the segregated vibration data to the baseline vibration data and/or the baseline vibrational condition of each operating state.

The methods and systems of the present disclosure may automatically or through user input determine a first operating state and at least one additional operating state (i.e., a second, third, fourth, fifth, sixth, seventh, eight, ninth, and tenth operating state), wherein two or more of the operating states may be aggregated in a data bin to analyze the aggregated operating states together. Vibration data may be discriminated according to the first operating state and the at least one additional operating state, wherein the first operating state and the at least one additional operating state may be segregated into at least one data bin. The first operating state and the at least one additional operating state may be grouped in different data bins to be analyzed separately or may be grouped in the same data bin and analyzed together. As a non-limiting example, speed may be a first operating state grouped with a second operating state such as temperature.

An operating state may have a value that changes during machine operation. Changes in the value may have a significant impact on the vibrational signature and/or function of a machine. A machine may have significantly different vibrational data within the same operating state depending on the value during machine operation. Thus, an operating band may be established within an operating state at a range of values wherein the vibrational data is similar, such as when the values are in a percent range of each other. As a non-limiting example, a machine operating at 600 rotations per minute (rpm) may result in significantly different vibration data compared to the same machine operating within the same operating state but at 1000 rpm. The percent range may include, but is not limited to, at least 1%, 2%, 3%, 4%, 5%, 10%, 15%, 20%, 25%, 30%, 35%, and at least 40%. The percent range may include, but is not limited to, less than 40%, 35%, 30%, 25%, 20%, 15%, 10%, 5%, 4%, 3%, 2%, and less than 1%. The methods and systems of the present disclosure may automatically and/or through user input determine at least one operating band for at least one operating state. A user may pre-determine the percent range for each operating band and/or the methods and systems may automatically determine the percent range for each operating band during and/or after collecting baseline vibration data. Each operating band may include a separate baseline and separate alarm thresholds and limits. Each operating band may be aggregated together or grouped in separate data bins to be analyzed together or separately, respectively. Each operating band may be independently and simultaneously monitored. Discriminating each operating band within the same operating state into different data bins to be analyzed separately may provide improved analysis, as it allows the comparison of similar data sets, which provides one or more of the following benefits: a decrease in the number of false alarms, increased accuracy of detecting abnormal operating conditions, increased precision in detecting abnormal operating conditions, and more accurate alarms compared to conventional methods. Aggregating the operating bands into the same data bin and analyzing them together enables the determination of which operating band is causing the abnormal machine behavior.

Conventional methods and systems known in the art are unable to effectively incorporate changes of values within the same operating state. Since changes within the same operating state may have a significant effect on vibrational signatures, conventional methods ineffectively compare unlike data sets. The methods and systems of the present disclosure may define and establish at least one operating band within each operating state to enable the comparison of similar vibrational data, which enables more accurate analysis of potentially abnormal machine behavior.

As a non-limiting example, the at least one operating band may include at least one speed band. The methods and systems of the present disclosure may automatically detect or may receive input from a user to determine at least one speed band, wherein a speed band comprises a range of speeds, such as rotations per minute (RPM) in which vibration data is grouped together in a data bin to be analyzed. Each speed band may include a separate baseline and separate alarm thresholds and limits compared to other speed bands. The methods and systems of the present disclosure may independently and simultaneously monitor each speed band. Vibration data samples for speed bands may be collected whether the machine is ramping up or down or in a steady operating state. While vibration data may be segregated within each speed band into a data bin corresponding to each speed band, the system may simultaneously monitor each speed band to provide an alarm when the segregated vibration data of any speed band has changed by a threshold amount according to the methods and systems of the present disclosure.

The method 100 may then determine when the segregated vibration data has changed from the baseline vibration data by a threshold amount for each operating state 160. The threshold amount may correspond to the at least one alarm threshold for each operating state, as each operating state may have more than one alarm threshold. An alarm threshold may correspond to a range of differences in the baseline vibration data compared to the collected vibration data. Once the difference in the baseline vibration data and collected vibration data has reached a threshold amount, an alarm may be triggered. As a non-limiting example, each operating state may have an alarm threshold for a critical and/or urgent abnormal operating condition and/or at least one intermediate level alert (FIG. 3). The methods and systems of the present disclosure may establish a pre-alert alarm threshold (FIG. 3), which may indicate that at least one abnormal operating condition may be developing, but it has not yet reached a threshold wherein an alarm threshold and alarm is indicated, allowing the methods and systems of the present disclosure to detect potentially problematic abnormal conditions prior to human detection and/or prior to the occurrence of the abnormal condition, which may damage the machine.

Figure 4A:
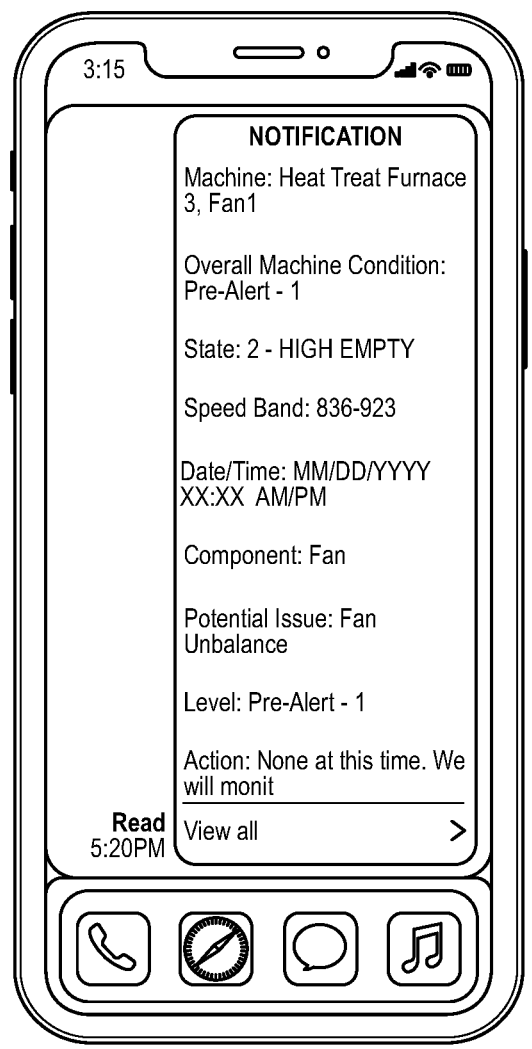
FIGS. 4A & 4B are a representation of a notification in accordance with aspects of the present disclosure.
Figure 4B:
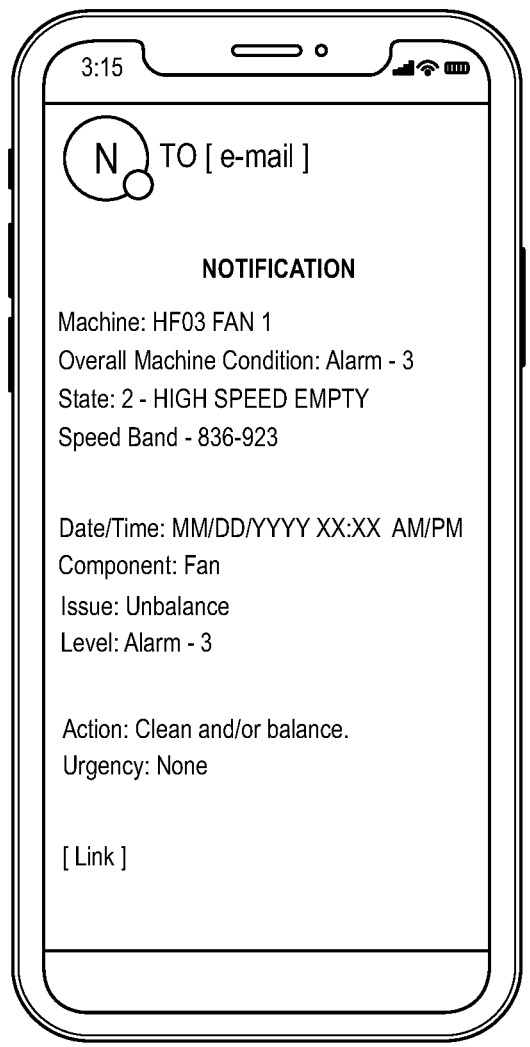

When a threshold amount has been reached, the systems and methods of the present disclosure will notify a user of an abnormal operating condition and that an alarm has been reached (FIGS. 3, 4A, & 4B). The number of alarms of the presently disclosed systems and methods are established according to any criterion that the user may choose to apply or established by the methods and systems of the present disclosure. The methods and systems of the present disclosure may, without the need for human intervention, establish alarms based on variations in the baseline vibration data wherein the machine is operating properly. The present disclosure may establish at least one alarm to correspond to the number of alarm thresholds.

The alarms of the presently disclosed systems and methods are adaptive and machine specific, as there are no adaptable industry standards for the manner or significance of alarms. The lack of adaptable industry standard may cause the wrong standard to be used once a change in state occurs or when there are multiple operating bands within the same operating state. Therefore, in one aspect, the systems and methods of the presently disclosed invention may establish different escalating alarms dependent upon the type of machine or machine component.

When an alarm threshold and an alarm have been reached, the methods and systems of the present invention may notify a user that the machine has reached an abnormal operating condition. In one aspect, the systems and methods may alert other control systems such as industrial automation systems, which may shut down the machine or notify a user that repair is necessary. The methods and systems of the present disclosure may determine and indicate to the user at least one fault or at least one potential fault causing the abnormal operating condition. A fault may include, but is not limited to, motor faults (generic rotor problem, broken or cracked rotor bar, stator problems, loose iron, phasing problem etc.), pump faults (problems with pump vanes, impellers, or gears, flow problems, etc.), fan faults (problems with fan blades or shroud, fan flow, etc.), gearbox faults (tooth wear, eccentricity backlash, tooth misalignment, cracked, chipped, or broken teeth, etc.), balance and alignment faults (misalignment, unbalance, etc.), belt drive faults (worn, loose, or misaligned belts, belt pulley misalignment, eccentric pulleys, belt drive slipping, etc.), impacting (crest factor) faults (roller bearing wear, cavitation and gear tooth wear, etc.), bearing faults (wear or clearance of journal/sleeve bearing, oil whirl in journal/sleeve bearing, rolling element bearing fault, etc.), looseness faults (mechanical looseness or soft foot, etc.), generic faults (high synchronous energy, high non-synchronous energy, high sub-synchronous energy, high raised floor, etc.), and user-defined faults, including but not limited to, any fault defined by a user that may be particular to a user's machine and/or is not standard in the industry. The methods and systems of the present disclosure may determine and indicate an unspecified issue. An unspecified issue may include a corresponding pre-alert level and/or notification.

Once an abnormal condition or a pre-alert level has been detected, the methods and systems of the present disclosure may collect the vibration data more frequently by increasing the number of samples within each sampling interval and/or increasing the frequency of sampling intervals. Thus, the methods and systems of the present disclosure may analyze the collected vibration data more frequently to help prevent further machine degradation.

After determining a fault, the presently disclosed invention may provide at least one recommended action to fix the abnormal operating condition or to prevent the abnormal operating condition from causing further damage. As a non-limiting example, the presently disclosed invention may indicate to the user at least one fault and provide a remedial recommendation to fix the at least one fault. The presently disclosed invention may also indicate to the user to shut down or slow down a machine to prevent further degradation. In some aspects, the methods and systems of the present disclosure may automatically shut down a machine once a user designated or automatically designated alarm threshold or limit has been reached. Recommended actions may include, but are not limited to, adjust, align, balance, or examine the machine part(s), check for and remove obstructions, repair or replace a component, and/or tighten or align the machine part(s).

The methods and systems of the present disclosure may be independent of machine state. Accordingly, the methods and systems of the present disclosure may determine an abnormal operating condition even if an operating state is incorrectly identified or monitored. Further, the methods and systems of the present disclosure may independently and/or simultaneously monitor each operating state.

Unlike conventional methods and systems in the art, the methods and systems of the present disclosure may effectively utilize acceleration as an operating state. While conventional methods typically ignore acceleration because it may provide unreliable data, the methods and systems of the present disclosure may reliably monitor acceleration as an operating state to determine abnormal operating conditions of a machine.

The methods and systems of the present disclosure may compare similar data sets and/or data bins, wherein conventional methods tend to compare all data sets, including dissimilar data sets. As a non-limiting example, the prior art may compare two different speeds, which leads to an increase in false alarms if the threshold is too low or a lack of alarms when abnormal operating conditions occur due to the alarm threshold being too high. The presently disclosed methods and systems provide one or more of: a more accurate, more precise, and more consistent analysis by comparing similar data sets, such as vibration data within the same speed band across different sampling intervals.

Conventional methods of vibration analysis do not provide or effectively incorporate operating states into real-time analysis of a machine to detect abnormal machine behavior. Conventional methods may attempt to infer the operating state from collected data. However, this type of analysis is ineffective, unreliable, and/or faulty. Thus, conventional methods may incorrectly determine abnormal operating conditions or may fail to detect abnormal operating conditions leading to continued machine degradation.

The presently disclosed methods and systems may monitor one or more parts of a machine. Even though the vibration data of each part individually may be too slight or modest to reliably identify an abnormal function or condition, the presently disclosed methods and systems may combine vibration data of two or more parts having the same operating state, wherein they are viewed or analyzed collectively to identify at least one abnormal condition. The exploitation of such features in this cumulative way supports a more sensitive threshold for detection of an abnormal condition and an early identification of its cause at an incipient stage. Thus, the presently disclosed invention may provide near-real time detection of an abnormal condition in a machine.

Conventional vibration analysis methods known in the art require a human operator or inspector to interpret broad data sets, especially data sets that are non-specific to each machine state. The disclosed methods and systems avoid the need for a vibration analyst or other human to intervene in the monitoring stage and thereby avoids potential errors due to human misjudgments. The methods and systems of the present disclosure are able to detect levels of abnormal machine behavior that would not otherwise be detectable by a human operator. As a non-limiting example, the methods and systems of the present disclosure may precisely and/or accurately monitor vibration data according to changes within each operating state that are relatively small in comparison to changes that are within the capability of human observation. The methods and systems of the present disclosure enable more reliable analysis of vibration data compared to methods and systems known in the art, which helps prevent further machine degradation until the problem is identified.

Since conventional vibration analysis methods and systems do not analyze machines according to each operating state, conventional vibration analysis is typically generic across all operating states, which prevents detection of abnormal operating conditions that may only be visualized by segregating the vibration data according to each operating state. Thus, the methods and systems of the present disclosure may provide more accurate, reliable, and/or consistent detection of abnormal machine behavior compared to the prior art.

Figure 2:
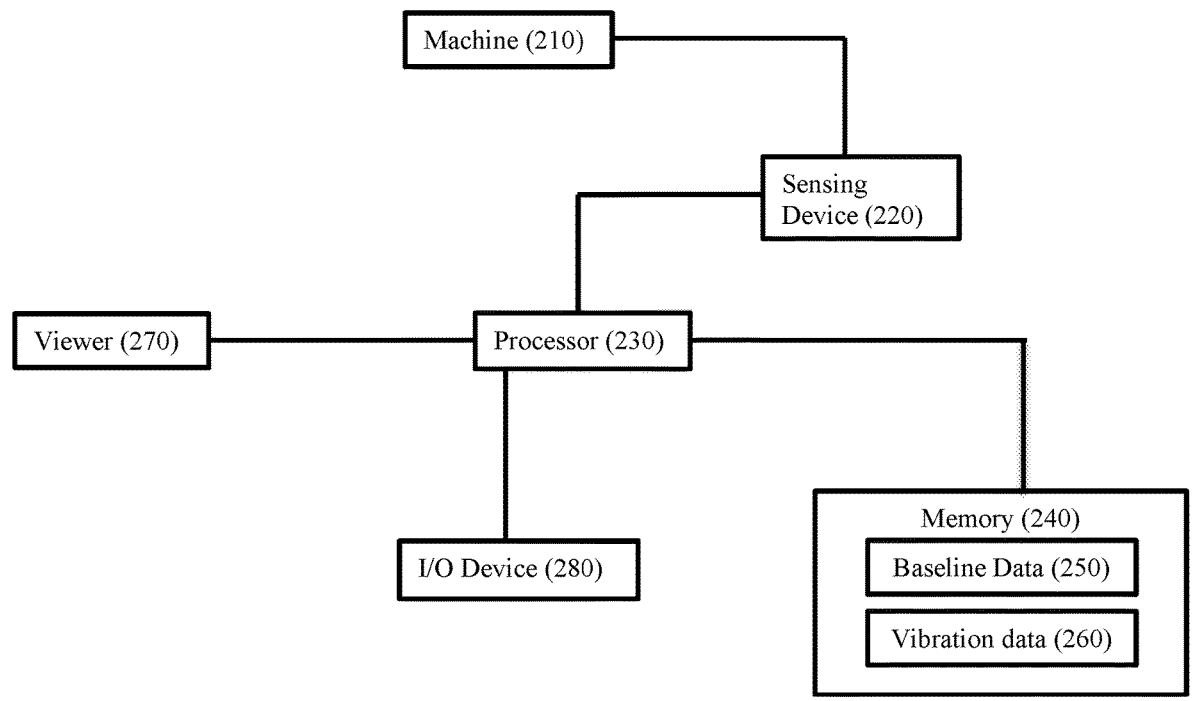
FIG. 2 is a block diagram of a system for detecting abnormal operation of a machine, in accordance with aspects of the present disclosure.

FIG. 2 is a block diagram that schematically illustrates a system 200 of the presently disclosed invention for identifying abnormal behavior of a machine using vibration data. The system may comprise a machine 210 and at least one sensing device 220 connected to at least one part of a machine. The system may further comprise an I/O device 280.

The presently disclosed invention provides systems for identifying abnormal behavior of a machine 210 while the machine 210 is in operation. The system 200 may comprise a sensing device 220 that generates vibration data in response to at least one monitored machine behavior. A sensing device 220 may include any device that generates a vibrational signature or desired machine measurement. The sensing device 220 of the presently disclosed invention monitors the operating behavior of a machine 210 at times when the machine is in operation and generates vibration data.

The sensing device 220 inputs vibration data to at least one processor 230. The processor 230 may be, for example and without limitation, a microprocessor, a microcontroller, or some other suitable processing device that interfaces with memory 240 (which may be separate from or included as part of processor 230). The memory 240 may also employ cloud-based memory. In one aspect, the system may connect to a base station that includes memory and processing capabilities.

Vibration data collected during real-time machine operation by the sensing device 220 may be stored in the memory 240 of the system 200. Memory 240 may also have stored therein baseline vibration data 250, which may comprise vibration data collected during machine 210 operation to determine a baseline vibrational condition of each operating state. Memory 240 may further have stored therein monitored vibration data 260 collected according to the methods of the present disclosure, which may comprise any vibration data collected while the machine 210 is in operation after the baseline vibration data 250 has been collected and stored in memory 240.

Memory 240 has stored therein a number of routines that are executable by processor 230. The processor 230, in communication with the memory 240 and the sensing device 220, may be configured to identify at least one operating state of the machine 210 according to the methods of the present disclosure. The system may include a set-up logic having at least one generic user input, wherein the set-up logic may define at least one operating state to monitor and/or at least one operating state to ignore. The methods and systems of the present disclosure may utilize a programmable logic controller (PLC) to perform the methods of the present disclosure. The PLC may provide speed and/or operating state data to the system of the present disclosure. The PLC may be a part of an industrial control system. As used herein, a "programmable logic controller (PLC)" may include a device capable of receiving data through at least one input and sending data and/or instructions through at least one output according to the methods of the present disclosure.

Processor 230 may execute computer executable instructions to collect baseline vibration data 250 to determine a baseline vibrational condition of each operating state according to the methods of the present disclosure. The processor 230 may collect monitored vibration data 260 according to the methods of the present disclosure and store the monitored vibration data 260 in the memory 240. According to some aspects, the system 200 may store the baseline vibration data 250 and the monitored vibration data 260 in a database. The system may then access the database to analyze changes in machine behavior overtime and/or analyze trends in conditions of multiple machines that may be connected or in separate unrelated systems.

The processer 230 may be configured to segregate the vibration data into at least one data bin according to each operating state of the machine in accordance with the methods of the present disclosure. The processor 230 may then analyze the segregated vibration data according to the methods of the present disclosure. The processor 230 may then determine when the segregated vibration data has changed from the baseline vibration data by a threshold amount for each operating state and/or each operating band established by the methods of the present disclosure.

The system 200 may further include a viewer 270 that is responsive to output signals from an output device. The viewer 270 may display text describing the abnormal behavior detected, any associated alarm or alarm threshold, and/or any recommended actions. The viewer 270 may include a mobile phone, computer, or any device capable of receiving an output signal from the processor 230.

The methods and systems may also notify a user of an abnormal behavior of machine through electronic mail (e-mail), text message, paper printout, or any other available methods of communication (FIGS. 4A & 4B).

The at least one sensing device may be attached to a structure to collect vibration data. A structure includes, but is not limited to, a building, roadway, bridge, tunnel, railway, dam, canal, power station, pipeline, retaining wall, offshore structure, and load bearing wall, beam, column, truss, or brace. The systems and methods of the present invention may monitor at least one operating state of a structure and may monitor vibration data to identify abnormal conditions of a structure.

The present disclosure provides methods and systems for identifying abnormal behavior of a structure including: identifying at least one operating state of the structure; collecting baseline vibration data to determine a baseline vibrational condition of each operating state; collecting vibration data of the structure; segregating the vibration data according to each operating state of the structure; analyzing the segregated vibration data; and determining when the segregated vibration data has changed from the baseline vibration data by threshold amount for each operating state.

Processor 230 may be one or more microprocessors, an application specific integrated circuit (ASIC), a circuit containing one or more processing components, a group of distributed processing components, circuitry for supporting a microprocessor, or other hardware configured for processing data. Processor is also configured to execute computer code stored in memory 240 to complete and facilitate the activities described herein.

I/O devices 280 (including, but not limited to, keyboards, displays, pointing devices, DASD, tape, CDs, DVDs, thumb drives and other memory media, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards may be just a few of the available types of network adapters.

Figure 5:
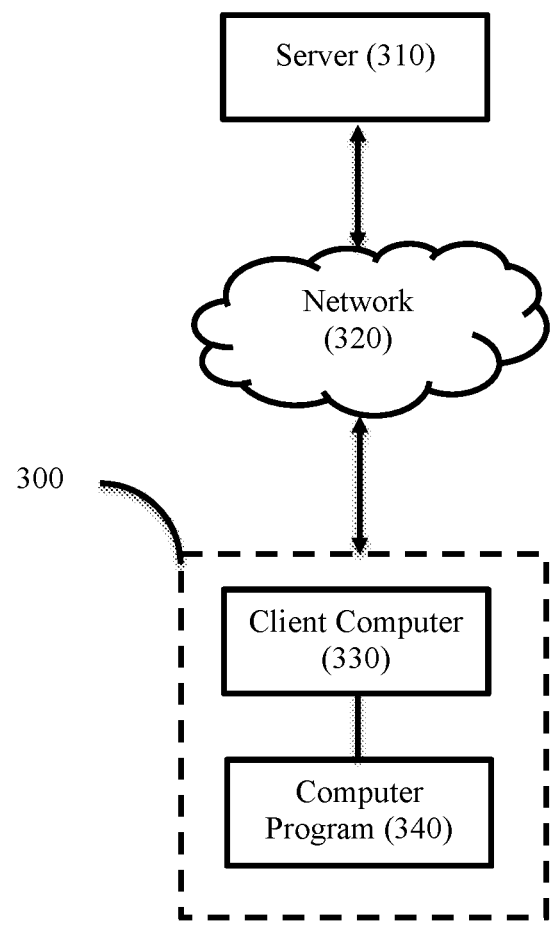
FIG. 5 is a block diagram of a computer network system in accordance with aspects of the present disclosure.

FIG. 5 depicts a schematic diagram of a computer network system 300 of the present disclosure. The computer network system 300 may interface a system user and a server 310 according to the interface operations of a client computer 330 running a computer program 340 through a network 320. Although the depicted computer network system 300 is shown and described herein with certain components and functionality, other aspects of the computer network system may include a plurality of servers 310 and a plurality of networks 320. Some aspects of the computer network system 300 may include similar components arranged in another manner to provide similar functionality in one or more aspects.

The client computer 330 manages the interface for the computer program 340 interaction with a system user and the server 310. The computer network system 300 may be connected to the server 310 via a network 320, including, but not limited to, a local area network (LAN), wireless network, mobile internet, Virtual Private Network (VPN), WiFi, broadband internet, ethernet connection, satellite connection, cable internet, and/or any other network or internet connection known in the art.

Although the present disclosure is described with regard to a "computer", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, a mobile device, or a personal digital assistant (PDA). Any two or more of such devices in communication with each other may optionally comprise a network or a computer network.

The network 320 may communicate traditional block I/O, for example, over a storage area network (SAN). The network 320 may also communicate file I/O, for example, using a transmission control protocol/internet protocol (TCP/IP) network or similar communication protocol. In one aspect, the storage system includes two or more networks. In another aspect, the client computer 330 is connected directly to a server 310 via a backplane or system bus. In one aspect, the network 320 includes a cellular network, other similar types of networks, or combinations thereof.

The computer network system 300 may include program instructions to store data in a centralized data store within a cloud environment. The data store may store and maintain data in both structured and unstructured formats.

The computer network system 300 may include program instructions for an API Gateway, wherein the API Gateway may manage traffic from the data store, services, and the client. The API Gateway may perform functions including, but not limited to, providing secure access to resources, auditing, usage policies, logging, and other API capabilities known in the art.

The computer network system 300 may include at least one computer service or cloud service offered by a third-party provider over the internet. A cloud service may include a cloud service generally known in the art having at least one feature including, but not limited to, CPU usage, data storage, bandwidth, and the like. A cloud service may replace physical computer hardware.

The computer network system 300 may include instructions to analyze abnormal machine behavior according to the methods and systems of the present disclosure.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "system." Furthermore, the presently disclosed invention may take the form of a computer program product embodied in any tangible medium of expression having computer useable program code embodied in the medium.

Any combination of one or more computer useable or computer readable medium(s) may be utilized. The computer-useable or computer-readable medium may be, for example but not limited to, an electronic, magnetic, optical, electromagnetic, infrared, or semiconductor system, apparatus, device, or propagation medium. Computer-readable medium may also be an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a digital versatile disk (DVD), a memory stick, a floppy disk, a mechanically encoded device such as punch-cards or raised structures in a groove having instructions recorded thereon, and any suitable combination of the foregoing. Note that the computer-useable or computer-readable medium may be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-useable or computer-readable medium may be any medium that can contain, store, communicate, propagate, or transport the program for use by or in connection with the instruction execution system, apparatus, or device. The computer-useable program code may be transmitted using any appropriate medium, including but not limited to wireless, wireline, optical fiber cable, RF, etc.

Computer program code for carrying out operations of the presently disclosed invention may be written in any combination of one or more programming languages. The programming language may be, but is not limited to, object-oriented programming languages (Java, Smalltalk, C++, etc.) or conventional procedural programming languages ("C" programming language, etc.). The program code may execute entirely on a user's computer, partly on the user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, which may include through the Internet using an Internet Services Provider. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the presently disclosed invention are described with reference to flowchart illustrations and/or block diagrams of methods, systems, and computer program products according to aspects of the presently disclosed invention. It will be understood that each block of the flowchart illustrations and/or block diagrams, and combination of blocks in the flowchart illustrations and/or block diagrams, may be implemented by computer program instructions. These computer program instructions may be provided to a processor of a general purpose computer, special purpose computer, or other programmable data processing apparatus to produce a machine, which the instructions execute via the processor of the computer or other programmable data processing apparatus allowing for the implementation of the steps specified in the flowchart and/or block diagram blocks or blocks.

Various aspects of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others.

Definitions

Unless otherwise defined, all terms (including technical and scientific terms) used herein have the same meaning as commonly understood by one of ordinary skill in the art to which this disclosure belongs. As such, terms, such as those defined by commonly used dictionaries, should be interpreted as having a meaning that is consistent with their meaning in a context of a relevant art and should not be interpreted in an idealized or overly formal sense unless expressly so defined herein.

As used herein, the term "machine" includes a solid article consisting of parts, or of certain devices and combination of devices. This includes but is not limited to, every mechanical device or combination of mechanical powers and devices to perform some function and produce a certain effect or result.

As used herein, the term "user" refers to any person, entity, corporation, individual, institution, and the like capable of utilizing the methods and systems of the present disclosure.

As used herein, the term "and/or" includes any and all combinations of one or more of the associated listed items. Likewise, as used in the following detailed description, the term "or" is intended to mean an inclusive "or" rather than an exclusive "or." That is, unless specified otherwise, or clear from context, "X employs A or B" is intended to mean nay of the natural inclusive permutations. Thus, if X employs A; X employs B; or X employs both A and B, then "X employs A or B" is satisfied under any of the foregoing instances.

The terminology used herein is for the purpose of describing particular examples only and is not intended to be limiting. As used herein, the singular forms "a", "an", and "the" may be intended to include the plural forms as well, unless the context clearly dictates otherwise. As example, "a" machine part may comprise one or more parts, and the like.

The terms "comprises", "comprising", "including", "having", and "characterized by", may be inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms may be to be understood as a non-restrictive term used to describe and claim various aspects set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics may be excluded from such an embodiment, but any compositions, materials, components, elements, features, integers, operations, and/or process steps that do not materially affect the basic and novel characteristics may be included in the embodiment.

Any method steps, processes, and operations described herein may not be construed as necessarily requiring their performance in the particular order discussed or illustrated, unless specifically identified as an order of performance. It is also understood that additional or alternative steps may be employed, unless otherwise indicated.

In addition, features described with respect to certain example aspects may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included may be combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Aspects of the present disclosure may be described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Words such as "then," "next," etc. are not intended to limit the order of the steps; these words may be simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

In the description, certain details are set forth in order to provide a better understanding of various embodiments of the systems and methods disclosed herein. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

While specific aspects of the disclosure have been provided hereinabove, the disclosure may, however, be embodied in many different forms and should not be construed as necessarily being limited to only the embodiments disclosed herein. Rather, these embodiments may be provided so that this disclosure is thorough and complete, and fully conveys various concepts of this disclosure to skilled artisans.

Note that various terminology used herein may imply direct or indirect, full or partial, temporary or permanent, action or inaction. For example, when an element is referred to as being "on," "connected" or "coupled" to another element, then the element may be directly on, connected or coupled to the other element or intervening elements may be present, including indirect or direct variants. In contrast, when an element is referred to as being "directly connected" or "directly coupled" to another element, there may be no intervening elements present.

Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

All numerical quantities stated herein may be approximate, unless stated otherwise. Accordingly, the term "about" may be inferred when not expressly stated. The numerical quantities disclosed herein may be to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, the term "about" refers to values within an order of magnitude, potentially within 5-fold or 2-fold of a given value. Notwithstanding the approximations of numerical quantities stated herein, the numerical quantities described in specific examples of actual measured values may be reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges may be continuous and include every value between the minimum and maximum values. Any maximum numerical limitation recited herein is intended to include all lower numerical limitations. Any minimum numerical limitation recited herein is intended to include all higher numerical limitations.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, may be at least partially performed via at least one entity or actor in any manner.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that may be within the scope of this application.

Aspects

Aspect 1: A method for identifying abnormal behavior of a machine, the method comprising: identifying at least one operating state of the machine; collecting baseline vibration data to determine a baseline vibrational condition of each operating state; collecting vibration data of the machine; segregating the vibration data according to each operating state of the machine; analyzing the segregated vibration data; and determining when the segregated vibration data has changed from the baseline vibration data by a threshold amount for each operating state.

Aspect 2: The method according to aspect 1, wherein the machine is a rotating or reciprocal machine.

Aspect 3: The method according to any of the foregoing aspects, wherein the at least one operating state comprises at least one operating band, wherein the at least one operating band comprises a range of values within the at least one operating state.

Aspect 4: The method according to any of the foregoing aspects, wherein the at least one operating state comprises a first operating state and at least one additional operating state, wherein the first operating state and the at least one additional operating state are grouped in a data bin and analyzed together.

Aspect 5: The method according to any of the foregoing aspects, wherein segregating the vibration data according to each operating state of the machine comprises discriminating the data according to at least one sampling interval.

Aspect 6: The method according to any of the foregoing aspects, wherein segregate the vibration data according to each operating state of the machine comprises discriminating the data according to at least one operating band.

Aspect 7: The method according to any of the foregoing aspects, wherein the baseline vibration data is collected during times of normal machine operation.

Aspect 8: The method according to any of the foregoing aspects, wherein collecting vibration data comprises collecting at least one sample of vibration data in at least one sampling interval.

Aspect 9: The method according to any of the foregoing aspects, wherein the at least one sampling interval is at least one second.

Aspect 10: The method according to any of the foregoing aspects, wherein analyzing the segregated vibration data comprises processing the segregated vibration data using at least one vibration analysis method.

Aspect 11: The method according to any of the foregoing aspects, further comprising the step of providing at least one recommended action.

Aspect 12: The method according to any of the foregoing aspects, further comprising the step of notifying a user of at least one abnormal behavior of the machine.

Aspect 13: The method according to any of the foregoing aspects, further comprising the step of notifying the user that at least one abnormal behavior of the machine has been detected.

Aspect 14: The method according to any of the foregoing aspects, further comprising the step of displaying a text notification of the at least one abnormal behavior.

Aspect 15: The method according to any of the foregoing aspects, further comprising the step of displaying a text notification of an at least one alarm level.

Aspect 16: The method according to any of the foregoing aspects, further comprising the step of displaying a text notification of the at least one recommended action.

Aspect 17: The method according to any of the foregoing aspects, wherein identifying at least one operating state of the machine further comprises prompting the user to define at least one operating state to monitor.

Aspect 18: The method according to any of the foregoing aspects, wherein identifying at least one operating state of the machine further comprises prompting the user to define at least one operating state to ignore.

Aspect 19: The method according to any of the foregoing aspects, wherein the method automatically identifies at least one operating state to monitor and at least one operating state to ignore.

Aspect 20: A method for identifying abnormal behavior of a structure, the method comprising: identifying at least one operating state of the structure; collecting baseline vibration data to determine a baseline vibrational condition of each operating state; collecting vibration data of the structure; segregating the vibration data according to each operating state of the structure; analyzing the segregated vibration data; and determining when the segregated vibration data has changed from the baseline vibration data by a threshold amount for each operating state.

Aspect 21: The method of aspect 21, further comprising identifying abnormal behavior of a machine attached to the structure.

Aspect 22: A system for identifying abnormal behavior of a machine at times when the machine is operating, said system comprising: a sensing device generating vibration data in response to at least one monitored machine behavior, a memory for storing vibration data, an electronic data processor that in communication with the memory and the sensing device, the data processor being configured to cooperate with the sensing device and the memory to: identify at least one operating state of the machine; collect baseline vibration data to determine a baseline vibrational condition of each operating state; collect vibration data of the machine; and segregate the vibration data according to each operating state of the machine; analyze the segregated vibration data; determine when the segregated vibration data has changed from the baseline vibration data by a threshold amount for each operating state.

Aspect 23: The system according to aspect 22, wherein the machine is a rotating or reciprocal machine.

Aspect 24: The system according to any of the foregoing aspects, wherein the at least one operating state comprises at least one operating band, wherein the at least one operating band comprises a range of values within the at least one operating state.

Aspect 25: The system according to any of the foregoing aspects, wherein the at least one operating state comprises a first operating state and at least one additional operating state, wherein the first operating state and the at least one additional operating state are grouped in a data bin and analyzed together.

Aspect 26: The system according to any of the foregoing aspects, wherein segregate the vibration data according to each operating state of the machine comprises discriminating the data according to at least one sampling interval.

Aspect 27: The system according to any of the foregoing aspects, wherein segregate the vibration data according to each operating state of the machine comprises discriminating the data according to at least one operating band.

Aspect 28: The system according to any of the foregoing aspects, wherein the baseline vibration data is collected during times of normal machine operation.

Aspect 29: The system according to any of the foregoing aspects, wherein collect vibration data comprises collecting at least one sample of vibration data in at least one sampling interval.

Aspect 30: The system according to any of the foregoing aspects, wherein the at least one sampling interval is at least one second.

Aspect 31: The system according to any of the foregoing aspects, wherein analyze the segregated vibration data comprises processing the segregated vibration data using at least one vibration analysis method.

Aspect 32: The system according to any of the foregoing aspects, wherein the data processor is configured to cooperate with the sensing device and the memory to provide at least one recommended action.

Aspect 33: The system according to any of the foregoing aspects, the data processor being configured to cooperate with the sensing device and the memory to identify at least one source of at least one abnormal behavior of the machine.

Aspect 34: The system according to any of the foregoing aspects, further comprising an output device that cooperates with the processor to transmit at least one output signal that at least one abnormal behavior of the machine has been detected.

Aspect 35: The system according to any of the foregoing aspects, wherein the system further comprises a viewer that is responsive to the at least one output signal from the output device.

Aspect 36: The system according to any of the foregoing aspects, wherein the viewer displays a text notification of the at least one abnormal behavior.

Aspect 37: The system according to any of the foregoing aspects, wherein the viewer displays a text notification of an at least one alarm level.

Aspect 38: The system according to any of the foregoing aspects, wherein the viewer displays a text notification of an at least one recommended action.

Aspect 39: The system according to any of the foregoing aspects, further comprising a set-up logic comprising at least one generic user input, wherein the set-up logic defines at least one operating state to monitor.

Aspect 40: The system according to any of the foregoing aspects, wherein the set-up logic defines at least one operating state to ignore.

Aspect 41: A system for identifying abnormal structural conditions of a structure, the system comprising: a sensing device that monitors at least one condition of the structure, the sensing device generating vibration data in response to at least one monitored structure condition, a memory for storing vibration data, an electronic data processor that in communication with the memory and the sensing device, the data processor being configured cooperate with the sensing device and the memory to: identify at least one operating state of the structure; collect baseline vibration data to determine a baseline vibrational condition of each operating state; collect vibration data of the structure; segregate the vibration data according to each operating state of the structure; analyze the segregated vibration data; and determine when the segregated vibration data has changed from the baseline vibration data by a threshold amount for each operating state.

Aspect 42: The system according to aspect 41, wherein the system identifies abnormal conditions of the structure and a machine.

Aspect 43: The system according to any of the foregoing aspects, wherein the system monitors the structure and the machine simultaneously.

What is claimed is:

1. A system for identifying abnormal behavior of a machine at times when the machine is operating, the system comprising: a sensing device generating vibration data in response to at least one monitored machine behavior, a memory for storing vibration data, an electronic data processor that in communication with the memory and the sensing device, the data processor being configured to cooperate with the sensing device and the memory to:

identify at least one operating state of the machine;
collect baseline vibration data to determine a baseline vibrational condition of each operating state;
collect vibration data of the machine;
segregate the vibration data according to each operating state of the machine;
analyze the segregated vibration data; and
determine when the segregated vibration data has changed from the baseline vibration data by a threshold amount for each operating state.

2. The system of claim 1, wherein the at least one operating state comprises at least one operating band, wherein the at least one operating band comprises a range of values within the at least one operating state.

3. The system of claim 2, wherein segregate the vibration data according to each operating state of the machine comprises discriminating the data according to at least one operating band for each operating state.

4. The system of claim 1, wherein the at least one operating state comprises a first operating state and at least one additional operating state, wherein the first operating state and the at least one additional operating state are segregated into separate data bins and analyzed separately.

5. The system of claim 1, wherein segregate the vibration data according to each operating state of the machine comprises discriminating the data according to at least one sampling interval.

6. The system of claim 1, wherein the at least one operating state comprises a first operating state and at least one additional operating state, wherein the first operating state and the at least one additional operating state are grouped in a data bin and analyzed together.

7. The system of claim 1, wherein the baseline vibration data is collected during times of normal machine operation.

8. The system of claim 1, wherein collect vibration data comprises collecting at least one sample of vibration data in at least one sampling interval.

9. The system of claim 8, wherein the at least one sampling interval is at least one second.

10. The system of claim 1, wherein analyze the segregated vibration data comprises processing the segregated vibration data using at least one vibration analysis method.

11. The system of claim 1, wherein the data processor is configured to cooperate with the sensing device and the memory to provide at least one recommended action.

12. The system of claim 1, further comprising an output device that cooperates with the processor to transmit at least one output signal that at least one abnormal behavior of the machine has been detected.

13. The system of claim 1, the data processor being configured to cooperate with the sensing device and the memory to identify at least one source of at least one abnormal behavior of the machine.

14. The system of claim 13, wherein the system further comprises a viewer that is responsive to the at least one output signal from the output device.

15. The system of claim 14, wherein the viewer displays a text notification of the at least one abnormal behavior.

16. The system of claim 14, wherein the viewer displays a text notification of an at least one alarm level.

17. The system of claim 14, wherein the viewer displays a text notification of an at least one recommended action.

18. The system of claim 1, further comprising a set-up logic comprising at least one generic user input, wherein the set-up logic defines at least one operating state to monitor.

19. The system of claim 18, wherein the set-up logic defines at least one operating state to ignore.

20. A system for identifying abnormal structural conditions of a structure, the system comprising:
a sensing device that monitors at least one condition of the structure, the sensing device generating vibration data in response to at least one monitored structure condition,
a memory for storing vibration data,
an electronic data processor that in communication with the memory and the sensing device, the data processor being configured cooperate with the sensing device and the memory to:
identify at least one operating state of the structure;
collect baseline vibration data to determine a baseline vibrational condition of each operating state;
collect vibration data of the structure;
segregate the vibration data according to each operating state of the structure;
analyze the segregated vibration data; and
determine when the segregated vibration data has changed from the baseline vibration data by a threshold amount for each operating state.

21. The system of claim 20, wherein the system identifies abnormal conditions of the structure and a machine.

22. The system of claim 21, wherein the system monitors the structure and the machine simultaneously.

23. A method for identifying abnormal behavior of a machine comprising:
identifying at least one operating state of the machine;
collecting baseline vibration data to determine a baseline vibrational condition of each operating state;
collecting vibration data of the machine;
segregating the vibration data according to each operating state of the machine;
analyzing the segregated vibration data; and
determining when the segregated vibration data has changed from the baseline vibration data by a threshold amount for each operating state.

24. The method of claim 23, wherein the at least one operating state comprises at least one operating band, wherein the at least one operating band comprises a range of values within the at least one operating state.

25. The method of claim 24, wherein each operating band is aggregated in a data bin to be analyzed together.

26. The method of claim 24, wherein each operating band is separated into a different data bin to be analyzed separately.

27. The method of claim 23, wherein the at least one operating state comprises a first operating state and at least one additional operating state, wherein the first operating state and the at least one additional operating state are grouped in a data bin and analyzed together.

28. The method of claim 23, wherein the at least one operating state comprises a first operating state and at least one additional operating state, wherein the first operating state and the at least one additional operating state are segregated into separate data bins and analyzed separately.

29. The method of claim 23, wherein segregating the vibration data according to each operating state of the machine comprises discriminating the data according to at least one sampling interval.

30. The method of claim 23, wherein segregate the vibration data according to each operating state of the machine comprises discriminating the data according to at least one operating band for each operating state.

31. The method of claim 23, wherein the baseline vibration data is collected during times of normal machine operation.

32. The method of claim 23, wherein collecting vibration data comprises collecting at least one sample of vibration data in at least one sampling interval.

33. The method of claim 32, wherein the at least one sampling interval is at least one second.

34. The method of claim 23, wherein analyzing the segregated vibration data comprises processing the segregated vibration data using at least one vibration analysis method.

35. The method of claim 23, further comprising providing at least one recommended action.

36. The method of claim 23, further comprising identifying at least one source of at least one abnormal behavior of the machine.

37. The method of claim 23, further comprising notifying a user that at least one abnormal behavior of the machine has been detected.

38. The method of claim 23, wherein identifying at least one operating state of the machine comprises prompting a user to determine at least one operating state to monitor.

39. The method of claim 23, wherein identifying at least one operating state of the machine comprises prompting a user to determine at least one operating state to ignore.

40. The method of claim 23, wherein the method automatically identifies at least one operating state to monitor and at least one operating state to ignore.

* * * * *